(12) United States Patent
Kennedy, Jr.

(10) Patent No.: US 8,677,399 B2
(45) Date of Patent: Mar. 18, 2014

(54) PREPROCESSING VIDEO TO INSERT VISUAL ELEMENTS AND APPLICATIONS THEREOF

(75) Inventor: Howard J. Kennedy, Jr., Hamilton Square, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 618 days.

(21) Appl. No.: 12/424,056

(22) Filed: Apr. 15, 2009

(65) Prior Publication Data

US 2009/0259941 A1    Oct. 15, 2009

Related U.S. Application Data

(60) Provisional application No. 61/045,211, filed on Apr. 15, 2008.

(51) Int. Cl.
*H04N 7/10* (2006.01)
(52) U.S. Cl.
USPC .................. 725/36; 725/32; 725/34; 725/35
(58) Field of Classification Search
None
See application file for complete search history.

(56) References Cited

U.S. PATENT DOCUMENTS

| 5,264,933 | A | 11/1993 | Rosser |
| 5,917,830 | A | 6/1999 | Chen |
| 6,229,550 | B1 | 5/2001 | Gloudemans |
| 6,317,885 | B1 | 11/2001 | Fries |
| 6,446,261 | B1 | 9/2002 | Rosser |
| 6,615,039 | B1 | 9/2003 | Eldering |
| 7,039,930 | B1 * | 5/2006 | Goodman et al. ............... 725/22 |
| 7,069,579 | B2 | 6/2006 | Delpuch |
| 2002/0044683 | A1 * | 4/2002 | Deshpande et al. .......... 382/165 |
| 2002/0087403 | A1 * | 7/2002 | Meyers et al. .................. 705/14 |
| 2009/0094637 | A1 * | 4/2009 | Lemmons ........................ 725/32 |
| 2009/0259941 | A1 * | 10/2009 | Kennedy, Jr. ................. 715/719 |

FOREIGN PATENT DOCUMENTS

| WO | WO 02/03706 A1 | 1/2002 |
| WO | WO 03/012744 A1 | 2/2003 |

OTHER PUBLICATIONS

European Patent Office, "PCT Notification of Transmittal of the International Search Report and the Written Opinion of the International Search Authority, or the Declaration," International Appln. No. PCT/US2009/002340, International Filing Date: Apr. 15, 2009, mailed Sep. 14, 2009, 14 pages.

* cited by examiner

*Primary Examiner* — Cai Chen
(74) *Attorney, Agent, or Firm* — Fay Kaplun & Marcin, LLP

(57) ABSTRACT

Embodiments of this invention relate to preprocessing video such that visual elements, such as advertisements, can be inserted at a later point in time when the video is requested by a user. In an embodiment, a video and target data is received. The video is analyzed to determine how a target moves and changes over time. Metadata describing how the target moves and changes over time is stored. When a user requests an on-demand video such as from a video sharing site, a visual element is inserted into the video. The visual elements move and change as defined in the stored metadata. In this way, advertisements can be inserted into on-demand video such as video from a video sharing website.

21 Claims, 6 Drawing Sheets

PREPROCESSING VIDEO TO INSERT VISUAL ELEMENTS AND APPLICATIONS THEREOF

CROSS-REFERENCE TO RELATED APPLICATIONS

This application claims the benefit of U.S. Provisional Appl. No. 61/045,211, filed Apr. 15, 2008.

BACKGROUND

1. Field of the Invention

This invention generally relates to video distribution and specifically to image processing.

2. Related Art

Video sharing sites, such as the YOUTUBE site available from Google Inc., have achieved great popularity. For example, at the YOUTUBE site, over 6.1 million videos are watched more than 100 million times a day. In contrast to traditional broadcast video, users can select these online video from a browser at their leisure and watch them on-demand.

Despite widespread popularity of video sharing sites such as the YOUTUBE site, translating popularity into revenue has been problematic. In a 2007 regulatory filing, the YOUTUBE site's revenue was identified as "not material." Since that time, the YOUTUBE site has posted text ads on a side panel of their webpage to attempt to capitalize on their popularity. While effective in earning some revenue, this method has shortcomings.

Because the text ads are positioned in a side panel and not within the video, a user may easily ignore them. Further, web developers may embed videos from video sharing sites into other websites. The other websites may display only the video and may not display the text ads. In this case, the video sharing site is burdened with storing and serving the video, while not receiving any advertising revenue.

U.S. Pat. No. 5,264,933 ("the '933 patent") to Rosser et al., incorporated by reference herein in its entirety, describes a system that can place visual elements, such as advertisements, in video.

Systems and methods are therefore needed to insert visual elements, such as advertisements, into on-demand video.

BRIEF DESCRIPTION OF THE DRAWINGS/FIGURES

Embodiments of the invention are described with reference to the accompanying drawings.

In the drawings, like reference numbers may indicate identical or functionally similar elements.

DETAILED DESCRIPTION

Embodiments of this invention relate to preprocessing video so that visual elements, such as advertisements, can be inserted at a later point in time when the video is requested by a user. In an embodiment, a video and target data is received. The video is analyzed to determine how a target moves and changes over time. Metadata describing how the target moves and changes over time is stored. When a user requests an on-demand video such as from a video sharing site, a visual element is inserted into the video. The visual elements move and change as defined in the stored metadata. In this way, advertisements can be inserted into on-demand video such as video from a video sharing website. In a further embodiment, visual elements may be inserted into video of motion pictures and live events.

Preprocessing System

Figure 1:
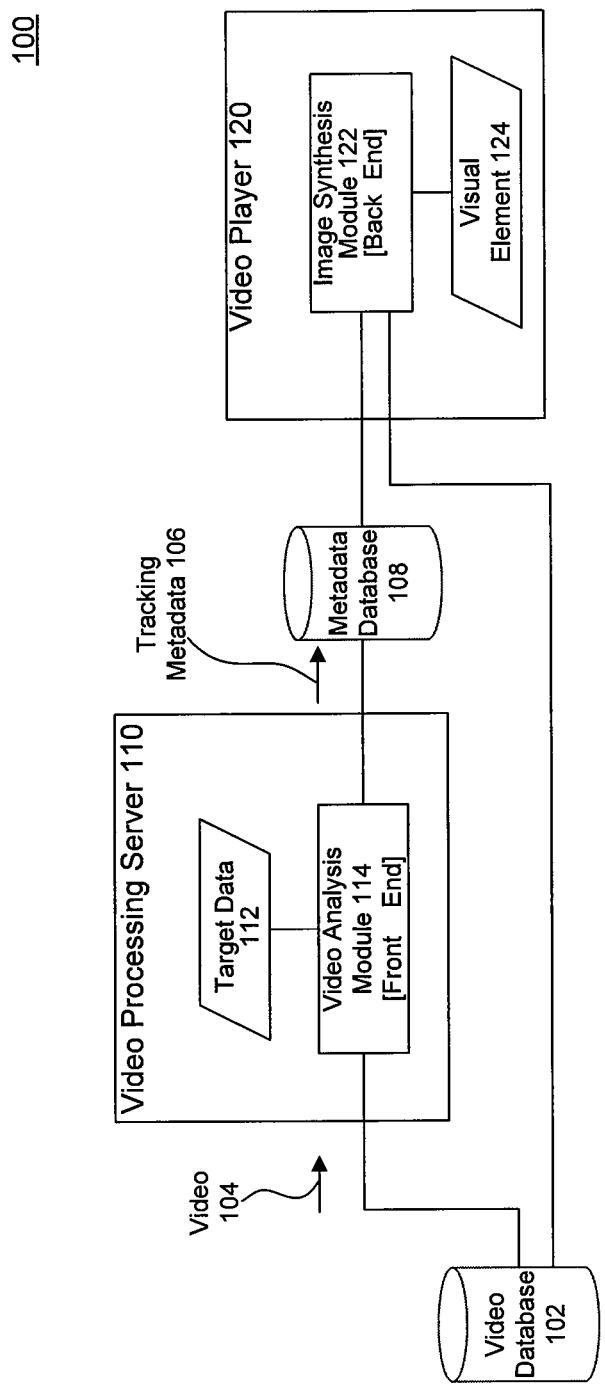
FIG. 1 is a diagram illustrating a system for preprocessing video to insert visual elements.

FIG. 1 is a diagram illustrating a system 100 for preprocessing video to insert visual elements, according to embodiments of the present invention. System 100 includes a video database 102, a video processing server 110, a metadata database 108 and a video player 120. Video processing server 110 includes a video analysis module 114, and video player 120 includes an image synthesis module 122.

In general, system 100 is configured to operate as follows. Video processing server 110 receives a video 104 from video database 102. Video analysis module 114 analyzes the video to track a target in video 104. Video analysis module 114 then stores tracking metadata 106 into a metadata database 108. At a later point in time, when a user views an on-demand video, image synthesis module 122 receives metadata from metadata database 108 and uses the metadata to insert a visual element 124 into the video. Each of the components of system 100 is described in more detail below.

In an embodiment, video processing server 110 is coupled to video database 102. Video database 102 stores one or more videos and may be any conventional type of database such as SQL. Video database 102 may be coupled to video processing server 110, for example, by an SQL connection. Alternatively, video database 102 may be configured to push data to video processing server 110, for example, using a web service. As would be appreciated by persons of skill in the art, other techniques for transferring videos to the video processing server may be used in embodiments of the present invention.

After video processing server 110 receives video 104, video analysis module 114 is configured to track a target in the video. The target is described in a target data 112. In an embodiment, target data 112 may define a portion of a frame, perhaps the first frame, in the video. As is be described in more detail below with respect to FIG. 2, target data 112 may be defined by a user. Then, video analysis module 114 may be configured to track the object depicted in the portion of the frame defined by target data 112. In another embodiment, target data 112 may indicate that the target is a particular object or has a particular color. In that case, video analysis module 114 may be configured to track the object defined by target data 112. To track the object, video analysis module 114 may use known pattern recognition techniques, such as those employed by the image analyzer described in the '933 patent.

Video analysis module 114 is configured to generate tracking metadata 106 for the video. When the video analysis module 114 tracks the target, video analysis module 114 may record the position and appearance of the target in multiple frames (perhaps each and every frame) as tracking metadata 106. As an example, to record the position of the target, tracking metadata 106 may include positional data for the center of the target in each frame. To record the appearance of the target, tracking metadata 106 may include information describing the geometry (e.g., size and orientation) and occlusion of the target. More detail on tracking metadata 106 is provided below with respect to FIG. 2. Once video analysis module 114 tracks the target, video processing server may store tracking metadata 106 in metadata database 108 for later use.

Video player 120 is configured to play a video. Video player 120 may run on a user's computing device such as, for example, a television, set-top box, personal computer or mobile device. In one example discussed in more detail with respect to FIG. 2, video player 120 may be a Flash program running within a browser on a computing device.

Video player 120 may present controls to, for example, select a video from a library of videos. When a particular video is selected, video player 120 retrieves the video and play the video. In an embodiment, video player 120 may also retrieve metadata that corresponds to the video from metadata database 108.

Metadata database 108 is a database that stores metadata that can be retrieved later. For example, the metadata may be retrieved at a later time when a user plays the video. In this way, the computationally intensive image analysis is done in advance, prior to the video being played.

Using the metadata for the video, image synthesis module 122 is configured to place a visual element 124 in the video. Visual element 124 may be an advertisement. Visual element 124 may have a variety of formats. For example, visual element 124 may be text, a graphic, or even a video to create a video-in-video effect. Image synthesis module 122 may be configured to adjust visual element 124 according to geometry information in metadata for the frame being processed. Further, image synthesis module 122 may be configured to block out a portion of visual element 124 according to occlusion information in the metadata for the frame being processed. In each frame of the video where the target is present, image synthesis module 122 inserts the modified visual element 124. Finally, video player 120 is configured to play the video with the inserted visual element 124.

Because of the resource intensive nature of generating the tracking metadata, video analysis module 114 may require larger, more expensive and sophisticated computing devices than a typical user's set-top box or personal computer. A set-top box or personal computer may provide adequate resources for the image synthesis module 122. When video analysis module 114 preprocesses videos to determine metadata that can be used at a later time, the intensive computations are performed in advance by a computer with adequate resources and perhaps not in the video's real time. For example, when tracking is done when a video is played, the analysis cannot take longer than the length of the video. With preprocessing is done in advance, video analysis module 114 could, for example, take a minute to track an object when the video lasts only 30 seconds. By taking advantage of preprocessing performed in advance by video analysis module 114, image synthesis module 122 running on user's computing device 140 can insert visual element 124 in real time as the video is played. In an alternative, the video analysis may be done in real time as the video is played. Further, running image synthesis module 122 on user's computing device 140 allows visual element 124 to be customized to a particular user.

Video Sharing System

Figure 2:
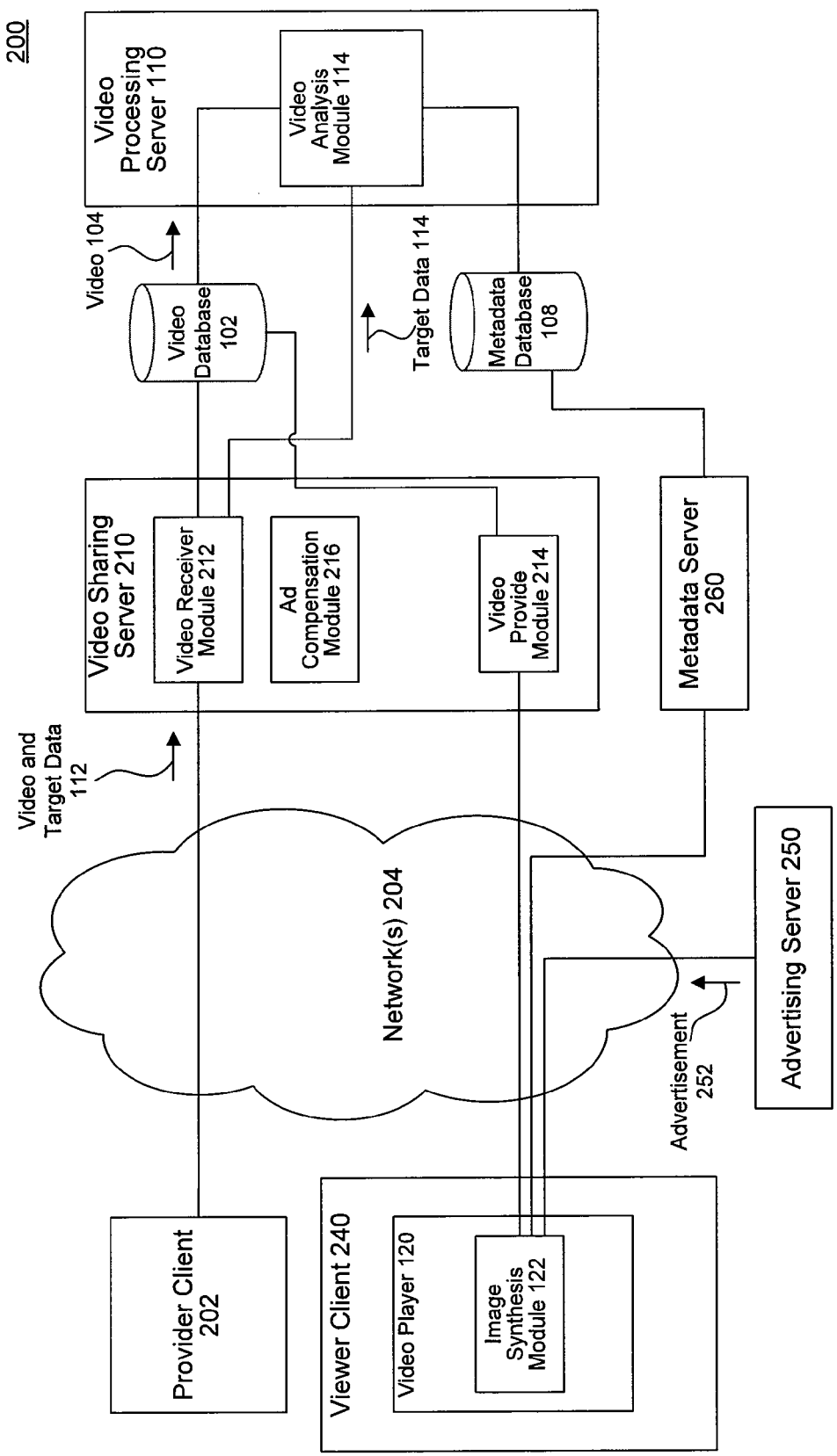
FIG. 2 is a diagram illustrating a system for preprocessing video on a video sharing site to insert visual elements.

FIG. 2 is a diagram illustrating a system 200 for preprocessing video on a video sharing site to insert visual elements, according to embodiments of the present invention. System 200 includes a provider client 202, a video sharing server 210, video processing server 110, a viewer client 240 and an advertising server 250.

Provider client 202 may be a computing device configured to enable a user ("the provider") to create a video and share the video on video sharing server 210. Provider client 202 may interface with video sharing server 210 via one or more networks 204 (such as the Internet). Provider client 202 may, for example, include a browser (not shown). Provider client 202 is configured to upload a user-created video to video sharing server 210.

Provider client 202 may be further configured to enable a user to select target data that describes a target in a user-created video. In an embodiment, provider client 202 may provide an interface for the user to select a portion of video frame that includes the target. As an example, provider client 202 may provide an interface that allows the user to select a rectangular portion of the video frame that includes the target. In that example, the target data may be the position and size of the rectangle in the frame. In another embodiment, provider client 202 may enable a user to enter a characteristic of the target. For example, a target may be paper or poster board of a particular color. The target data selected by a user may be the color of the target. In a third embodiment, video sharing server 210 may provide a pre-defined pattern to provider client 202. Provider client 202 may print out the predefined pattern, and the user may film the printed pattern in the background of the user created video. In that case, target data may be information about the predefined pattern or simply a selection indicating that the predefined pattern is filmed as part of the video. Alternatively, the pattern may be automatically detected by downstream processes in the video.

After enabling a user to make the above selections, provider client 202 sends a video and target data 112 to video sharing server 210. Video sharing server 210 may host a video sharing website, such as a YOUTUBE site, that enables users to share and rate videos. Video sharing server 152 may include a web server that responds to a hypertext transfer protocol (HTTP) request with an HTTP reply. As illustrative examples, the web server may be, without limitation, Apache HTTP Server, Apache Tomcat, MICROSOFT Internet Information Server, JBoss Application Server, WEBLOGIC Application Server, or SUN Java System Web Server. The web server may serve content such as hypertext markup language (HTML), extendable markup language (XML), documents, videos, images, multimedia features, or any combination thereof. Video sharing server 210 may include a video receiver module 212, an ad compensation module 216 and a video provider module 214. Video receiver module 212 is configured to receive video and target data 112 from provider client 202. Video receiver module 212 may, for example, receive video and target data 112 as HTTP parameters in an HTTP request. Video receiver module 212 may store the video in video database 102.

Figure 5:
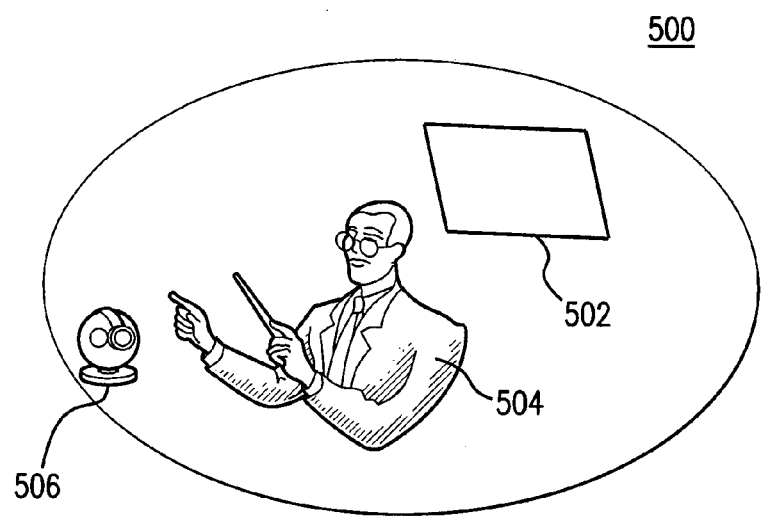
FIGS. 5-6 are diagrams depicting an illustrative example of inserting visual elements in video.

FIG. 5 shows a diagram 500 that illustrates a user 504 making a video to place on a video sharing site such as video sharing server 210. In diagram 500, a camera 506 is filming user 504 and a target 502. As mentioned earlier, target 502 may, for example, be a predefined pattern provided by the video sharing server. As described above, user 504 may upload the video to a video sharing website. The video is then preprocessed to determine metadata that defines how target 502 changes in appearance over time. The metadata is stored for later use.

When a user submits a video with target data for an advertisement, the user may receive compensation. The ad compensation module 216 is configured to track data that will be used to compensate the user for allowing the video to display an advertisement. For example, ad compensation module 216 may track use of the video by third parties. When a video is uploaded, ad compensation module 216 may set up the method of payment. For example, ad compensation module 216 may prompt the user for bank account information or an address to send checks. Ad compensation module 216 may track use of the video, for example, on a fixed sum, per-click, or per-view basis. Ad compensation module 216 may track data to compensate a user by providing additional services. For example, a video with advertising space may have a higher resolution or better audio than videos without advertising space.

As described above with reference to FIG. 1, video processing server 110 is configured to preprocess videos. Video processing server 110 may, for example, be configured to query video database 102 periodically for new videos. When video processing server 110 receives a new video 104, video processing server 110 uses video analysis module 114 to generate the metadata.

As described above, video analysis module 114 is configured to create metadata describing how the target appears in the video. Video analysis module 114 may be configured to analyze the video to track the target across multiple frames of the video. For example, video analysis module 114 may scan the video for frames in which the target is most visible (e.g., least occluded). Then, video analysis module 114 may repeatedly scan the video to develop a three dimensional model of the video using, for example, structure-from-motion techniques. The three dimensional model may enable the target to be tracked in three dimensions, making for more accurate metadata. The metadata may be indexed to the video. In one embodiment, the metadata for a video may include a portion of metadata corresponding to each and every frame in the video.

In different embodiments, the metadata can define the appearance of the target in different ways. In an embodiment, the metadata describes a shape into which visual elements would be inserted. For example, the metadata may define the four points of a quadrilateral corresponding to the target. In another example, the metadata could merely define the size, position and orientation of the target. In another embodiment, the metadata could define a camera model according to the camera movements. The camera model may define how the camera moves relative to the target at each frame of the video. For example, if the target gets larger, the metadata may indicate that the camera is zooming in. In another example, if the target is moving to the left of a frame, the metadata may indicate that the camera is turning right.

The metadata may similarly define how the target is occluded throughout the video. For example, the metadata may define if another object is in the foreground occluding target. In one embodiment, the metadata could define a shape defining any foreground objects in each frame of the video. For example, if the target is partially occluded by an individual's head, then the metadata may define the outline of the head. This approach has the advantage of not requiring a great deal of memory and bandwidth.

In a further embodiment, the metadata define what color the target is in each frame. The metadata may include a color range, or sets of color ranges of the target in each frame. This embodiment may, for example, be used when the target is a solid color such as a poster board or a wall. In this embodiment, the image synthesis module 122 may have to determine the shape of the foreground later when the video is played. This approach may require even less memory and bandwidth than defining the outline, but may require additional processing by viewer client 240.

In another embodiment, the metadata could include a mask that defines whether the target is in the foreground or background on a pixel-by-pixel basis, similar to an alpha channel. In this embodiment, each pixel in at least a portion of each frame may have a corresponding byte that indicates whether the target is in the foreground, background or in between. In one example, the mask byte's value may have a scale running from zero to 100. If the target is not occluded, the mask byte's value may be zero. If the target is partially blocked by another object (e.g., somebody's head), then the mask byte's value may be zero around the blocking object and 100 on the blocking object. Around the edges of the blocking object, the mask byte's value may gradually fade from 100 to zero.

Referring back to FIG. 2, after the metadata is stored in metadata database 108, the metadata may be available to be served along with the video. Viewer client 240 may be a user's computing device and may, for example, include a browser (not shown). The browser may download a Flash file from video sharing server 210 and run the Flash file as video player 120.

Viewer client 240 includes a video player 120 and an image synthesis module 122. Video player 120 and image synthesis module 122 were described above with respect to FIG. 1. Viewer client 240 is configured to enable a user to search the videos available on video sharing server 210. When the user selects a video, viewer client 240 sends a request for the video to video sharing server 210. Video provider module 214 streams the video to video player 120. In an embodiment, video provider module 214 accesses metadata database 108 and embeds the metadata directly into the video. In that embodiment, with each frame of video, video provider module 214 may send the portion of metadata that corresponds to that frame.

In another embodiment, when video player 120 requests a video from video sharing server 210, video player 120 makes a separate request to metadata server 260 for the metadata corresponding to the video. For example, metadata server may send the metadata in XML format. In this embodiment, video player 120 may receive the video and the metadata from different servers and may have to assemble them to synchronize the metadata with the video.

Video player 120 may assemble the videos in several different ways. Video player 120 may use the timestamp of each frame to correlate the frame with its associated metadata. For example, if the frame is played 12.43 seconds into the video, video player 120 may find the portion of metadata for the frame at that time. Similarly, the frames may be numbered and the corresponding portion of metadata may be recalled based on that number. For example, the 37th frame may have a corresponding portion of metadata keyed off the number 37.

In an alternative embodiment, the frame itself may be used to correlate the frame with the correct portion of metadata. In that embodiment, a checksum may be performed on the frame or a portion of the frame, (e.g., a subset of 100 pixels). The checksum function may result in a number nearly unique to that frame. In other words, there is a low probability that the checksum function will return the same number for two different frames. In an example, a checksum function may be a hash function. Video player 120 may look up the resulting number in a table to determine the corresponding metadata. In this way, video player 120 can correlate frames to metadata without using a timestamp.

Once video player 120 locates the metadata that corresponds to a frame, image synthesis module 122 is configured to insert a visual element into the frame as specified by the metadata. In an embodiment, video player 120 may request an advertisement 252 from advertising server 250.

Advertising server 250 stores a set of visual elements such as advertisements. The metadata may specify the advertisement, e.g. URL defining a particular advertising server 250 and a particular visual element. Advertisement 252 may be customized for a user based on, for example, a profile, as would be known to those skilled in the art given this description. Image synthesis module 122 may insert advertisement 252 into the video as defined by the metadata.

To insert advertisement 252, image synthesis module 122 may distort advertisement 252 as specified by the metadata. In examples, if the metadata defines a camera model, image synthesis module 122 may distort the advertisement according to how the camera moves. The advertisement may be distorted to simulate a three dimensional change in perspective. If the metadata defines a shape, image synthesis module 122 may distort the advertisement to fit the shape. Further, the advertisement may also be positioned and oriented according to the metadata.

In addition to distorting advertisement 252, image synthesis module 122 may determine the portion of the distorted advertisement that may be occluded by foreground objects. To do this, image synthesis module 122 uses the portion of the metadata corresponding to the frame. In examples, if the metadata defines an outline of the occluded portion, then image synthesis module 122 may only insert the portion of the distorted image outside the outline. If the metadata defines a mask, image synthesis module 122 may combine the distorted image with the distorted image by applying the mask.

After advertisement 252 has been inserted into a frame of the video, video player 120 displays the frame to a user. Video player 120 may repeatedly insert visual elements, such as advertisements, into frames in real time as the video is played. By executing image analysis tasks at video processing server 110, video player 120 may be left with only lightweight processing that can be done, for example, at a user's computing device. Different video players may be configured to handle metadata with different formats and may require different computing resources. For example, a video player configured to combine visual elements with video frames based on bit mask metadata may require more computing resources than a video player configured to combine visual elements with video frames based on metadata merely defining the outline of the target. In this example, a video player may indicate its capabilities to a server, such as video sharing server 210. The server may transmit back to the video metadata formatted according to the video player's capabilities. One example of video player 120 playing a video is illustrated in FIG. 6.

Figure 6:
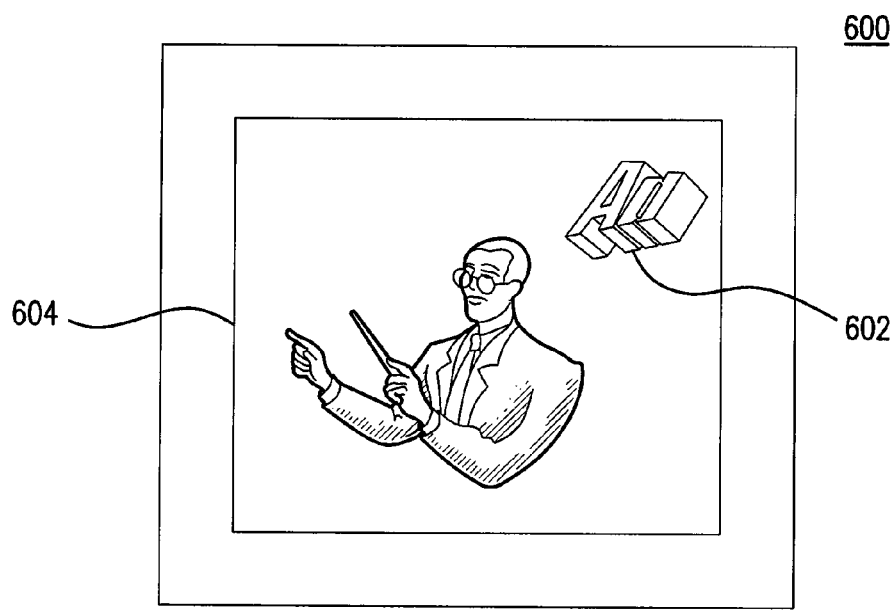

FIG. 6 shows a diagram 600 illustrating a video 604 being played. As described above, video 604, the metadata, and an advertisement 602 are sent to the user's video player. The video player distorts advertisement 602 and inserts advertisement 602 into video 604 according to the metadata. Finally, the video player displays the modified video 604 to the user.

Figure 7:
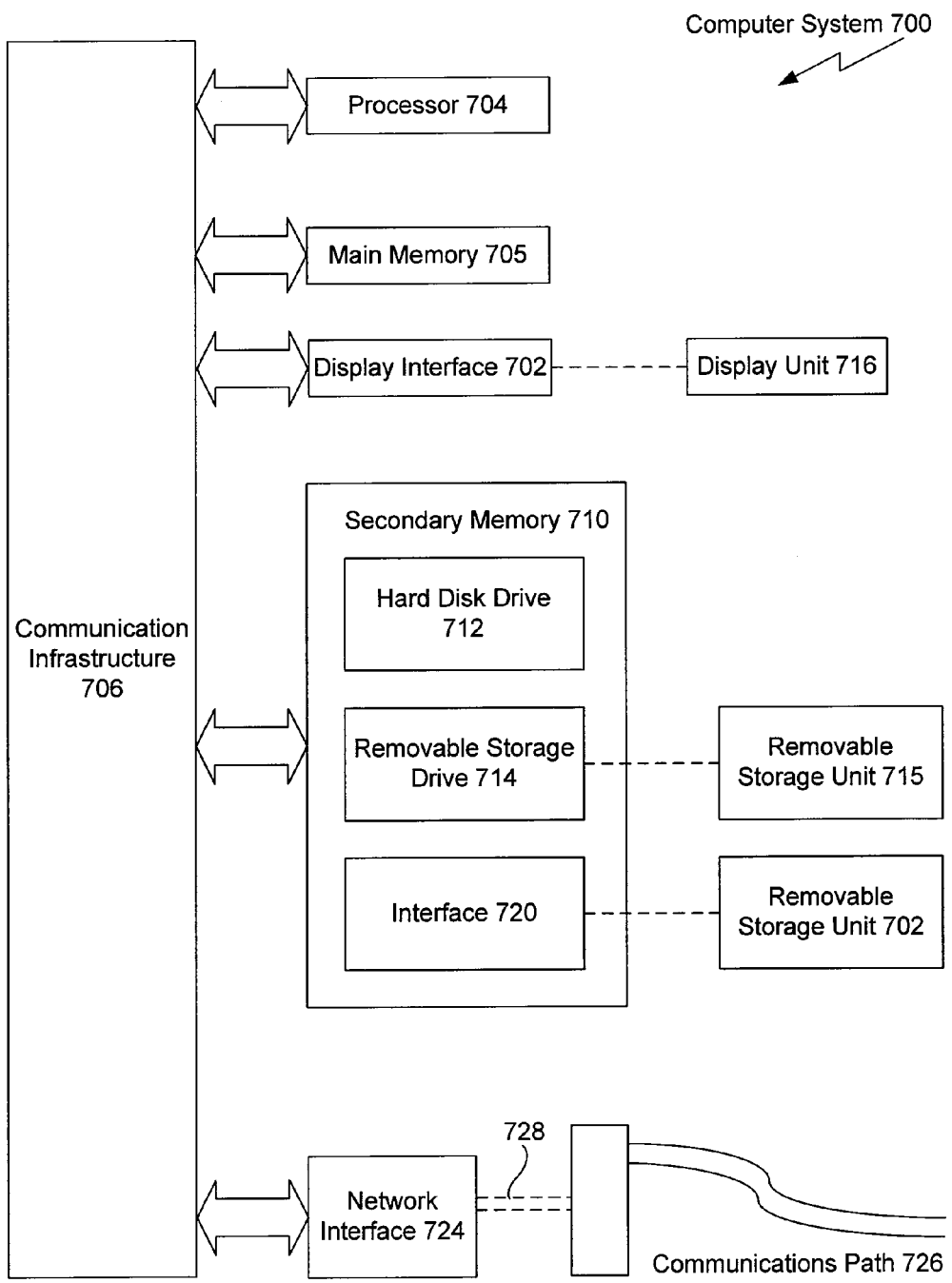
FIG. 7 is a diagram illustrating an example computing device which may be used in embodiments of this invention.

Provider client 202, video sharing server 210, video processing server 110, advertising server 250, metadata server 260 and viewer client 240 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm. An exemplary computing device is illustrated in FIG. 7, described below.

Each of video receiver module 212, ad compensation module 216, video provider module 214, video analysis module 114, and image synthesis module 122 may be implemented in hardware, software, firmware or any combination thereof.

Video database 102 and metadata database 108 may be implemented in any type of storage. For example, video database 102 and metadata database 108 may be persistent memory managed by a relational database management system.

Methods

Figure 3:
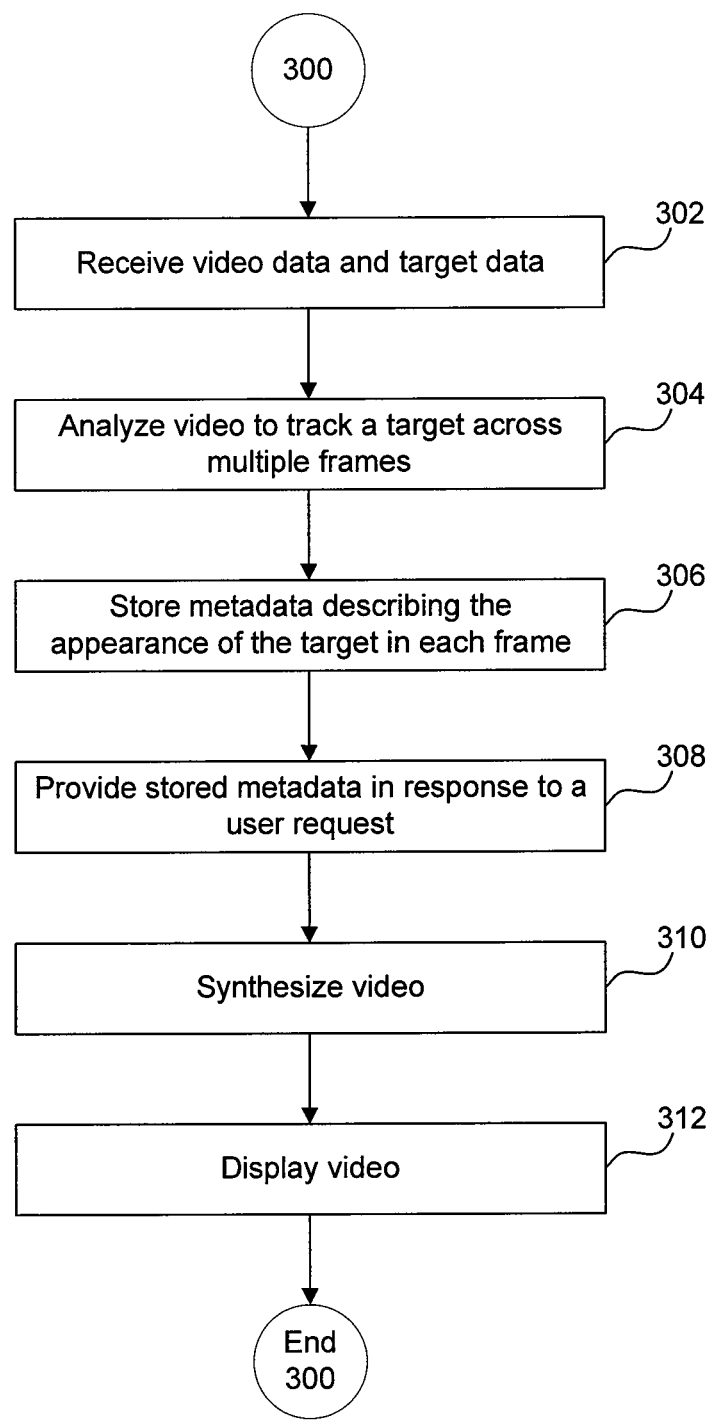
FIG. 3 is a flowchart illustrating a method to insert visual elements in video.

FIG. 3 is a flowchart 300 illustrating a method to insert visual elements in video, according to an embodiment of the present invention. Method 300 begins by receiving video and target data at step 302.

At step 304, the video is analyzed to track the target across multiple frames of the video. For example, the video may be analyzed by scanning the video for frames in which the target is most visible (e.g., least occluded). Then, the video may be repeatedly scanned to develop three dimensional models of the video using, for example, structure-from-motion techniques. The three dimensional model may enable the target to be tracked in three dimensions making for more accurate metadata. The metadata describes the appearance of the target in each frame of the video.

At step 306, the metadata is stored to provide a later point in time in response to a user request to view the video.

At step 308, the stored metadata is provided in response to a user request.

At step 310, the metadata is used to synthesize a video and a visual element, such as an advertisement. More detail on how the visual element is inserted into the video based on the metadata is provided with respect to FIG. 4.

Finally, at step 312, the video is displayed to a user.

Figure 4:
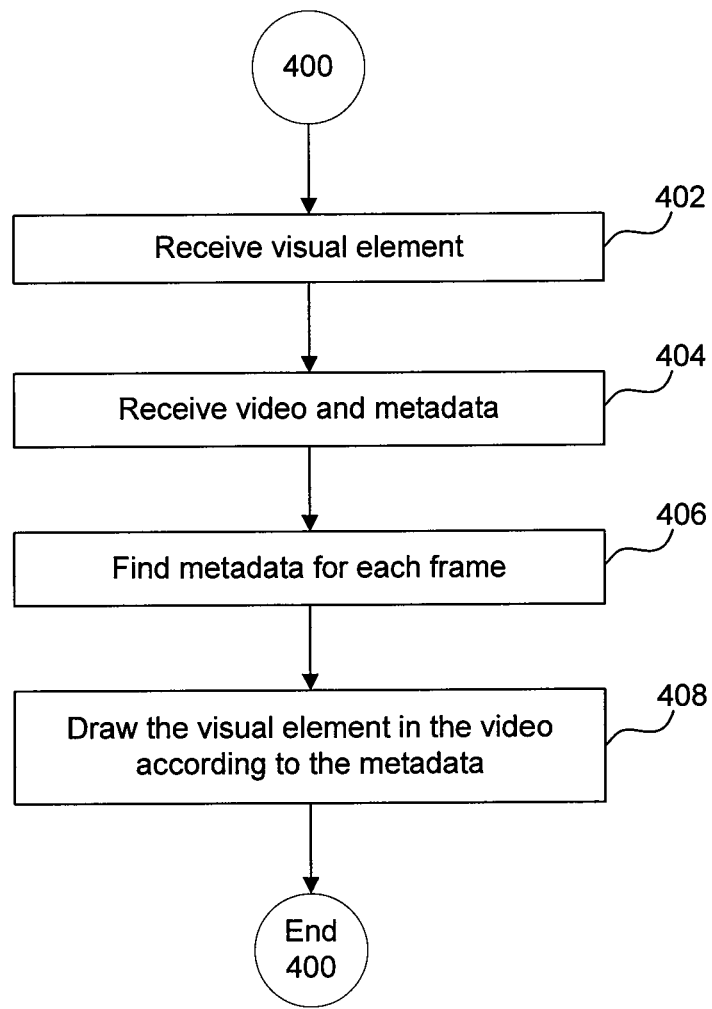
FIG. 4 is a diagram illustrating a method to synthesize video with a visual element.

FIG. 4 is a flowchart 400 illustrating a method to synthesize video with a visual element, according to embodiments of the present invention. The method begins by receiving a visual element, such as an advertisement, at step 402. As mentioned above, the advertisement may be customized to a user.

At step 404, video and corresponding metadata are received. In one embodiment, each video frame may be received with its corresponding portion of metadata. In an alternative embodiment, the video and metadata are received separately. In other embodiments, the video and metadata may be received first and the visual element may be received at a later point time. Also, the video may be received and additional processing may take place to determine that the video has corresponding metadata.

In that case, each frame may be correlated with its corresponding portion of metadata at step 406. In embodiments, each frame may be correlated with its corresponding portion of metadata according to the frame number, the frame's timestamp, a checksum value, or closed caption text.

With a frame correlated with its corresponding metadata, the visual element is inserted (e.g., drawn) in the frame according to the metadata. For example, the visual element may be distorted according to the metadata. The visual element may be distorted to match the position, size, and orientation (perhaps three dimensional orientations) of the target in the frame. The distorted visual element may be further modified according to the occlusion information in the metadata. Finally, the visual element is inserted into the frame of the video. Steps 406 and 408 may be repeated for each frame of the video. In this way, a visual element, such as an advertisement, may be synthesized with a video without having to execute the necessary preprocessing when the video is played.

Example Computing Device

FIG. 7 is a diagram illustrating an example computing device which may be used in embodiments of this invention. The computing device 700 includes one or more processors, such as processor 704. The processor 704 is connected to a communication infrastructure 706 (e.g., a communications bus, cross over bar, or network). Various software embodiments are described in terms of this exemplary computing device. After reading this description, it will become apparent to a person skilled in the relevant art(s) how to implement the invention using other computing devices and/or architectures.

Computing device 700 can include a display interface 702 that forwards graphics, text, and other data from the communication infrastructure 706 (or from a frame buffer not shown) for display on the display unit 730.

Computing device 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar devices for allowing computer programs or other instructions to be loaded into computing device 700. Such devices may include, for example, a removable storage unit 718 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 718 and interfaces 720, which allow software and data to be transferred from the removable storage unit 718 to computing device 700.

Computing device 700 may also include a communications interface 724. Communications interface 724 allows software and data to be transferred between computing device 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computing device 700. The invention is directed to such computer program products.

Computer programs (also referred to as computer control logic) are stored in main memory 708 and/or secondary memory 710. Computer programs may also be received via communications interface 724. Such computer programs, when executed, enable the computing device 700 to perform the features of the present invention, as discussed herein. In particular, the computer programs, when executed, enable the processor 704 to perform the features of the present invention. Accordingly, such computer programs represent controllers of the computing device 700.

In an embodiment where the invention is implemented using software, the software may be stored in a computer program product and loaded into computing device 700 using removable storage drive 714, hard disk drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for processing a user generated video to generate metadata to insert a visual element into a video, comprising:
   (a) processing, on a first computing device, target data and the video to determine metadata corresponding to the video, wherein the metadata describes how a three dimensional orientation of a target appears in multiple frames of the video;
   (b) storing the metadata for the video;
   (c) providing the stored metadata to a second computing device in response to a request from the second computing device received after steps (a) and (b) have been performed, wherein the second computing device inserts a visual element into the video as defined by the metadata and distorts the visual element to simulate changes to the three dimensional orientation of the target while a perspective of the target changes during the multiple frames of the video; and (d) determining data to be used to compensate a provider of the video for allowing the video to display the visual element.

2. The method of claim 1, wherein the metadata describes a position and geometry of the target in multiple frames of the video.

3. The method of claim 2, further comprising receiving the video and the target data from the provider computing device prior to processing.

4. The method of claim 3, wherein receiving the video and the target data comprises receiving the target data, the target data including data representing a portion of particular frame of the video that includes at least a portion of the target.

5. The method of claim 3, wherein receiving the video and the target data comprises receiving the target data, the target data including data representing a characteristic of the target.

6. The method of claim 3, wherein the visual element is an advertisement.

7. The method of claim 2, further comprising:
(e) embedding the metadata within the video such that when each frame of the video is streamed to the second computing device; and
(f) providing the video having the embedded metadata to the requesting computing device.

8. The method of claim 2, wherein the metadata further comprises occlusion data that describes whether the target is occluded by another object in the video.

9. A system for processing a user generated video to generate metadata to insert a visual element into a video, comprising:
a video analysis module configured to determine, on a computing device, metadata corresponding to a video and target data, wherein the metadata describes an appearance of a three dimensional orientation of a target in multiple frames of the video;
a metadata database, including a memory, that stores the metadata for the video;
a video provider module configured to provide the stored metadata to a computing device in response to a request from the computing device to view the video, wherein the computing device inserts a visual element into the video as defined by the metadata and distorts the visual element to simulate changes to the three dimensional orientation of the target while a perspective of the target changes during the multiple frames of the video; and
an ad compensation module configured to determine data to be used to compensate a provider of the video for allowing the video to display the visual element.

10. The method of claim 9, wherein the metadata describes a position and geometry of the target in multiple frames of the video.

11. The system of claim 10, further comprising:
a video receiver module configured to receive the video and the target data from a provider computing device.

12. The system of claim 11, wherein the target data includes data representing a portion of a particular frame of the video that includes at least a portion of the target.

13. The system of claim 11, wherein the visual element is an advertisement.

14. The system of claim 10, wherein the video provider module is configured to embed the metadata within the video.

15. The system of claim 10, wherein the metadata further comprises occlusion data that describes whether the target is occluded by another object in the video.

16. The system of claim 9, further comprising:
a provider computing device configured to enable a user to select target data for a user created video and to send the video and the target data; and
a computing device configured to receive the video and metadata and to request an advertisement customized to a user, and comprises:
an image synthesis module configured to insert the advertisement in the video at a position and with geometry defined in the metadata.

17. The system of claim 16, wherein the computing device is configured to determine a checksum value from at least a portion of a frame of the video to correlate the frame of the video with its corresponding portion of metadata.

18. A system for inserting visual elements into video, comprising:
a video analysis module configured to determine, on a computing device, metadata corresponding to a video and target data, wherein the metadata describes an appearance of a three dimensional orientation of a target in multiple frames of the video;
a metadata database, that includes a memory, that stores the metadata;
a video sharing server that includes:
a video provider module configured to provide, at a later point in time, the stored metadata to a computing device in response to a request from the computing device to view the video, wherein the computing device inserts an advertisement into the video as defined by the metadata and distorts the visual element to simulate changes to the three dimensional orientation of the target while a perspective of the target changes during the multiple frames of the video; and
an ad compensation module configured to determine data to be used to compensate a provider of the video for allowing the video to display the advertisement.

19. The system of claim 18, wherein the video sharing server further comprises a video receiver module configured to receive the video and the target data from a provider computing device.

20. A system for inserting visual elements into video, comprising:
a computing device configured to receive the video and metadata and to request an advertisement customized to a user, and comprises:
an image synthesis module configured to insert the advertisement in the video at a position and with geometry defined in the metadata, the image synthesis module further configured to distort the advertisement to simulate changes to a three dimensional orientation of the metadata while a perspective of the advertisement changes during the multiple frames of the video; and
an ad compensation module configured to determine data to be used to compensate a provider of the video for allowing the video to display the advertisement.

21. The system of claim 20, wherein the computing device is configured to determine a checksum value from at least a portion of a frame of the video to correlate the frame of the video with its corresponding portion of metadata.

* * * * *